United States Patent [19]

Merkle et al.

[11] Patent Number: 5,542,804

[45] Date of Patent: Aug. 6, 1996

[54] MODULAR SOLIDS CHARGER

[75] Inventors: Frank P. Merkle, Hanover; Larry L. Horn, Galena; Barry R. James, Apple River; William L. Merkle, Elizabeth, all of Ill.

[73] Assignee: Merkle Engineers, Inc., Galena, Ill.

[21] Appl. No.: 295,946

[22] Filed: Aug. 25, 1994

[51] Int. Cl.⁶ ........................................................ C03B 3/00
[52] U.S. Cl. ............................ 414/165; 198/750.8; 65/27; 65/335
[58] Field of Search ...................... 414/160, 165, 414/166, 172, 192, 198, 182; 198/750.8, 771, 860.1; 193/26, 7; 65/27, 335, 135.9, 136.2

[56] References Cited

U.S. PATENT DOCUMENTS

| | | | |
|---|---|---|---|
| 3,780,889 | 12/1973 | Frazier et al. | 414/166 |
| 4,142,880 | 3/1979 | Wenda et al. | 414/165 X |
| 4,264,351 | 4/1981 | Pieper | 414/165 X |
| 4,545,717 | 10/1985 | Wittler et al. | 414/166 |
| 4,983,206 | 1/1991 | Trunzo | 414/166 X |
| 5,073,183 | 12/1991 | Hammond et al. | 414/166 X |
| 5,158,412 | 10/1992 | Merkle | 414/166 |
| 5,238,347 | 8/1993 | James | 414/165 |
| 5,254,151 | 10/1993 | Larson et al. | 414/166 X |

FOREIGN PATENT DOCUMENTS 527656 7/1956 Canada ................................ 414/165

*Primary Examiner*—David A. Bucci
*Attorney, Agent, or Firm*—Speckman, Pauley & Fejer

[57] ABSTRACT

A modular solids charger for feeding granular solid material to a reactor, the charger comprising a chassis, a charger plate support frame vertically and angularly adjustable with respect to the horizontal secured to the chassis, a removable reciprocable charger plate reciprocably secured to the charger plate support frame, a removable solids supply chute disposed above the reciprocable charger plate for feeding solids to the reciprocable charger plate, spacers for adjusting the elevation of the chassis to accommodate a range of elevations of reactor feed openings, and charger plate support frame extensions to enable the charge plate support frame to accommodate a range of reciprocable charger plate widths.

16 Claims, 8 Drawing Sheets

MODULAR SOLIDS CHARGER

BACKGROUND OF THE INVENTION

1. Field of the Invention

This invention relates to a charging apparatus for introducing granular solid materials into a reactor, such as, introduction of raw batch material into a glass melter. More particularly, this invention relates to a modular charging apparatus for introducing granular solid materials into a reactor, which charging apparatus, due to its modularity, can be adapted to fit a wide range of reactor openings through which the granular solid materials are charged into the reactor.

2. Description of Prior Art

Batch chargers for feeding raw batch material to glass furnaces are well known as exemplified by U.S. Pat. No. 4,983,206 which teaches a batch charger having a charger plate supported on an array of sets of rollers, each set of rollers including a front and a rear roller mounted to a roller frame and each roller frame for each set of rollers having a jack positioned beneath its front and rear portions for independently raising and lowering the front and rear ends of the charger plate.

U.S. Pat. No. 5,158,412 teaches a solids charger having a reciprocable charger plate reciprocably mounted in fixed angular relation to a charger plate support with reciprocating drive means fixedly mounted to the charger plate support and connected by an adjustable connecting rod to the rear end of the reciprocable charger plate, the connecting rod reciprocating generally parallel to the plane of the charger plate. A plurality of jacks connected at their one end to the main support frame and at their opposite end to the charger plate support with front jacks beneath and pivotably connected to a front region of the charger plate support and rear jacks beneath and pivotably connected to a rear region of the charger plate support are provided for independently raising and lowering the front and rear ends of the charger plate.

In accordance with the teachings of both of the above cited U.S. patents, the disclosed granular solids chargers are mounted on the floor, or on a support on the floor, in front of the opening through which the granular solid material is introduced into the reactor and feed the granular solid material over the blocks of the reactor wall forming the opening in the reactor. In glass melters, the batch chargers are disposed in front of the doghouse of the glass melter and feed raw batch material over the doghouse blocks into the glass melter.

One disadvantage of known solids chargers is their general lack of adaptability to a wide range of charger openings. That is, known solids chargers are typically designed and constructed to correspond to a given solids charging opening in a reactor wall. As a result, changes in charger opening dimensions require the installation of an entirely new solids charger.

SUMMARY OF THE INVENTION

Accordingly, it is one object of this invention to provide a solids charger which is readily adaptable to changes in charger opening dimensions, which changes generally result from changes in growth requirements of the user.

It is another object of this invention to provide a solids charger which can be readily modified to accommodate charger plate widths over a wide range.

It is yet another object of this invention to provide a solids charger unit which can be installed together with other solids charger units in a single installation to fulfill the same function as a single, full-width solids charger. As a result, one of the solids charger units can be removed from service with substantially less impact on reactor operation than, for example, removal from service of a full-width solids charger.

These and other objects of this invention are achieved by a modular solids charger for feeding granular solid material to a reactor comprising a chassis, a charger plate support frame vertically and angularly adjustable with respect to the horizontal secured to the chassis, a removable reciprocable charger plate reciprocably secured to the charger plate support frame, a removable solids supply chute disposed above the reciprocable charger plate for feeding solids to the reciprocable charger plate, means for adjusting the elevation of the chassis to accommodate a range of elevations of reactor feed openings, and means for adjusting the width of the charger plate support frame to accommodate a range of reciprocable charger plate widths. In a particularly preferred embodiment of this invention, the means for adjusting the width of the charger plate support frame comprises at least one bolt-on extension. In accordance with another embodiment of this invention, spacers are provided which permit adaptation of the chassis to accommodate a range of reactor feed opening elevations.

As a result of its modular design, the modular solids charger of this invention permits replacement of the removable reciprocable charger plate and removable solids supply chute disposed above the reciprocable charger plate with removable reciprocable charger plates and removable solids supply chutes of varying dimensions as necessary for a given application. Common to all units of the modular solids charger of this invention are a core chassis and a charger plate support frame, both of which are adaptable to accommodate various sizes of reciprocable charger plates and solids supply chutes.

A unique design feature of the modular solids charger of this invention is a floating link arrangement which attaches the charger plate support frame to the chassis.

BRIEF DESCRIPTION OF THE DRAWINGS

These and other features and objects of this invention will be better understood from the following detailed description taken in conjunction with the drawings wherein.

DESCRIPTION OF PREFERRED EMBODIMENTS

Figure 1:
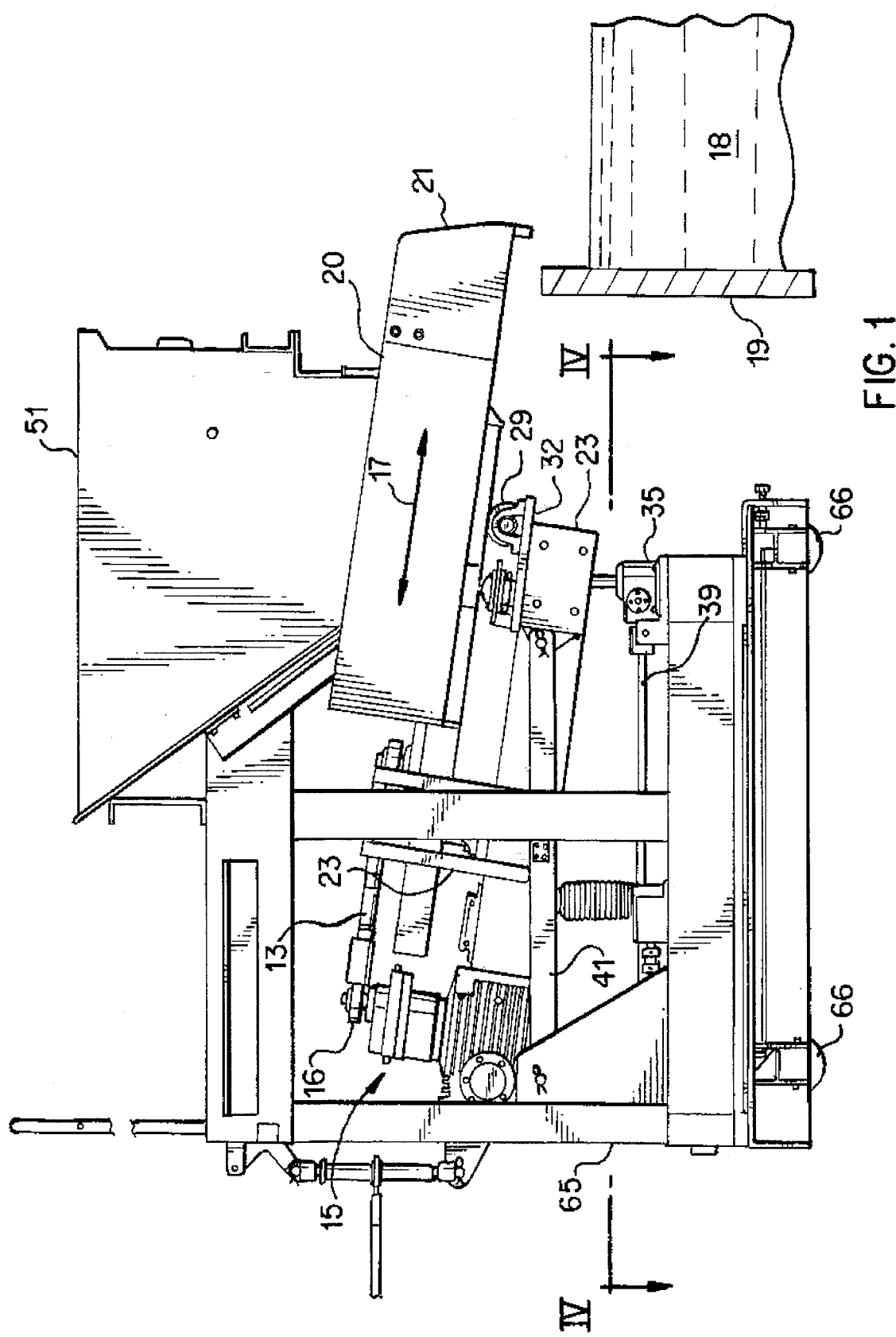
FIG. 1 is a side view of a modular solids charger for feeding granular solid material to a reactor in accordance with one embodiment of this invention.

FIG. 1 shows a side view of a modular solids charger in accordance with one embodiment of this invention comprising a chassis 65, a charger plate support frame 23 movably connected to chassis 65 by charger plate frame support link 41, removable charger plate assembly 20 reciprocably secured to charger plate support frame 23 and solids supply chute 51 disposed above removable charger plate assembly 20 and secured to chassis 65 whereby granular solid material is fed to the rear end of removable charger plate assembly 20 which is reciprocated in the direction indicated by arrow 17 to cause flow of the granular solid material downwardly to the front of removable charger plate assembly 20 and to drop into reaction material 18 within reactor 19. In many chemical processes, such as glass making, the manner of feeding granular solid raw material to the reaction mixture is important. In glass making, a batch charger is used to feed raw batch into a continuously operated glass furnace or melter. The batch charger feeds raw batch into one end of the furnace to maintain the desired level as molten glass is withdrawn from the opposite end of the furnace. The rate of melt is at least partially determined by the size and shape of the piles of batch that are fed to the liquid mix in the furnace. This is partially controlled by the angle of the charger plate, the height of the charger plate from the top surface of the molten glass in the furnace, and the width of the charger plate.

By the terminology "granular solids" as used throughout this specification and the claims is meant solid particulate material in any shape and size suitable for movement on a reciprocating downwardly angled charger plate, including powder material, larger generally spherical particles and non-spherical particles or agglomerates, such as cullets of glass. While the description of preferred embodiments is primarily directed to glass batch chargers, it will be recognized that the solids charger of this invention is applicable to feeding solids to a wide variety of other chemical and/or physical reactions. By the terms "reaction" and "reactor" as used throughout this specification and claims is meant any chemical and/or physical reaction and vessel for its conduct, such as combustion and melting.

As shown in FIG. 1, the modular solids charger of this invention comprises chassis 65 mounted on wheels 66 for travel toward and away from reactor 19. Reciprocable removable charger plate assembly 20 comprising charger plate nose plate 21 is reciprocably mounted on charger plate support frame 23 comprising generally flat support structure 32 upon which are mounted front charger plate roller means in the form of front charger plate rollers 29 for support of removable charger plate assembly 20 and rear charger plate roller means shown, in FIG. 3, including lower rear charger plate rollers 34 and upper rear charger plate rollers 33 which serve to respectively support and guide removable charger plate assembly 20. These rollers and their contact with removable charger plate assembly 20 may be effected by any roller means known to the art, such as rollers against rollers, rollers against a track guide or the like.

Figure 2:
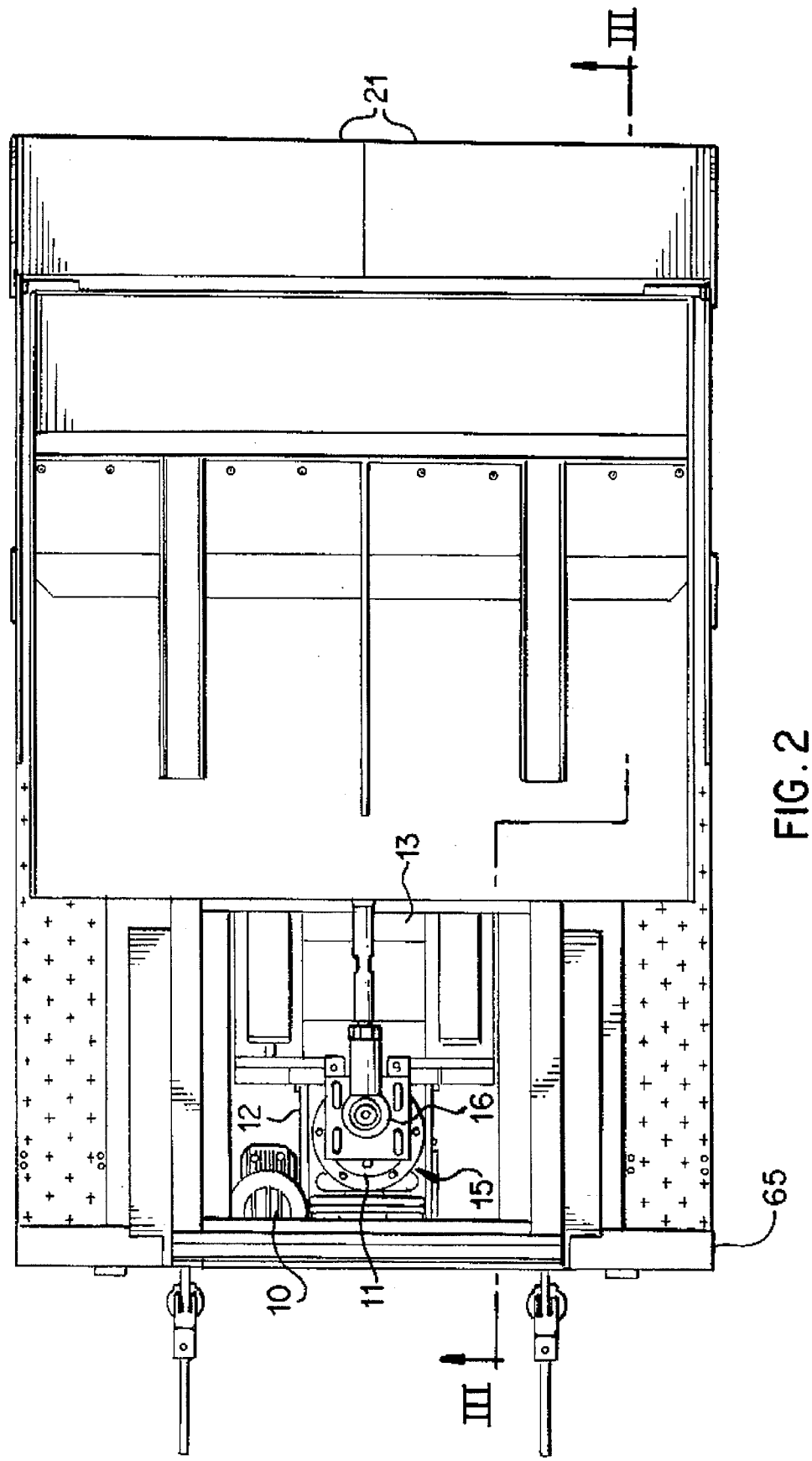
FIG. 2 is a top view of the modular solids charger shown in FIG. 1.

Charger plate reciprocating means 15 is fixedly mounted to charger plate support frame 23 and, as shown in FIGS. 1 and 2, comprises motor 10 connected to speed reducer 12 which drives adjustable eccentric drive 11. Adjustable eccentric drive 11 is mechanically linked by eccentric rod end 16 to link 13 which, in turn, is connected by rod end 14 to removable charger plate assembly 20. Any suitable drive means known to the art to provide reciprocating force to link 13 may be used in the modular solids charger of this invention provided that it is fixedly mounted to charger plate support frame 23.

Figure 3:
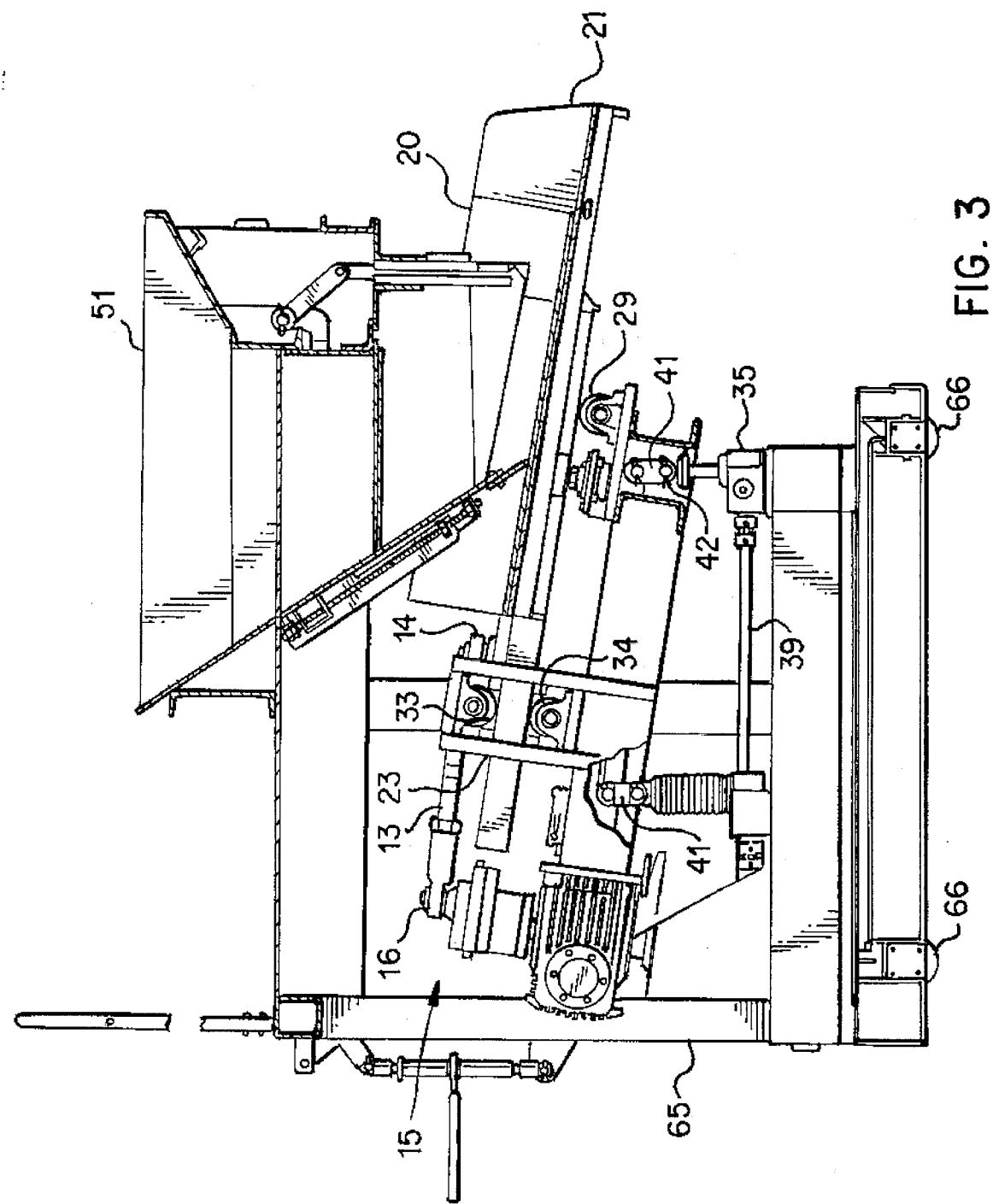
FIG. 3 is a sectional view of the modular solids charger in accordance with one embodiment of this invention taken along the line II—II shown in FIG. 2.

Vertical and angular adjustment of removable charger plate assembly 20 is achieved in accordance with one embodiment of this invention by elevation jacking means comprising elevation jack 35 disposed beneath and pivotally connected to a front region of charger plate support frame 23 and angle jacking means comprising angle jack 44 disposed beneath and pivotally connected to a rear region of charger plate support frame 23. In accordance with a preferred embodiment of this invention as shown in FIG. 3, elevation jack 35 and angle jack 44 are connected by charger plate frame support links 41 to charger plate support frame 23 and held in position by charger plate frame support link pins 42.

Figure 4:
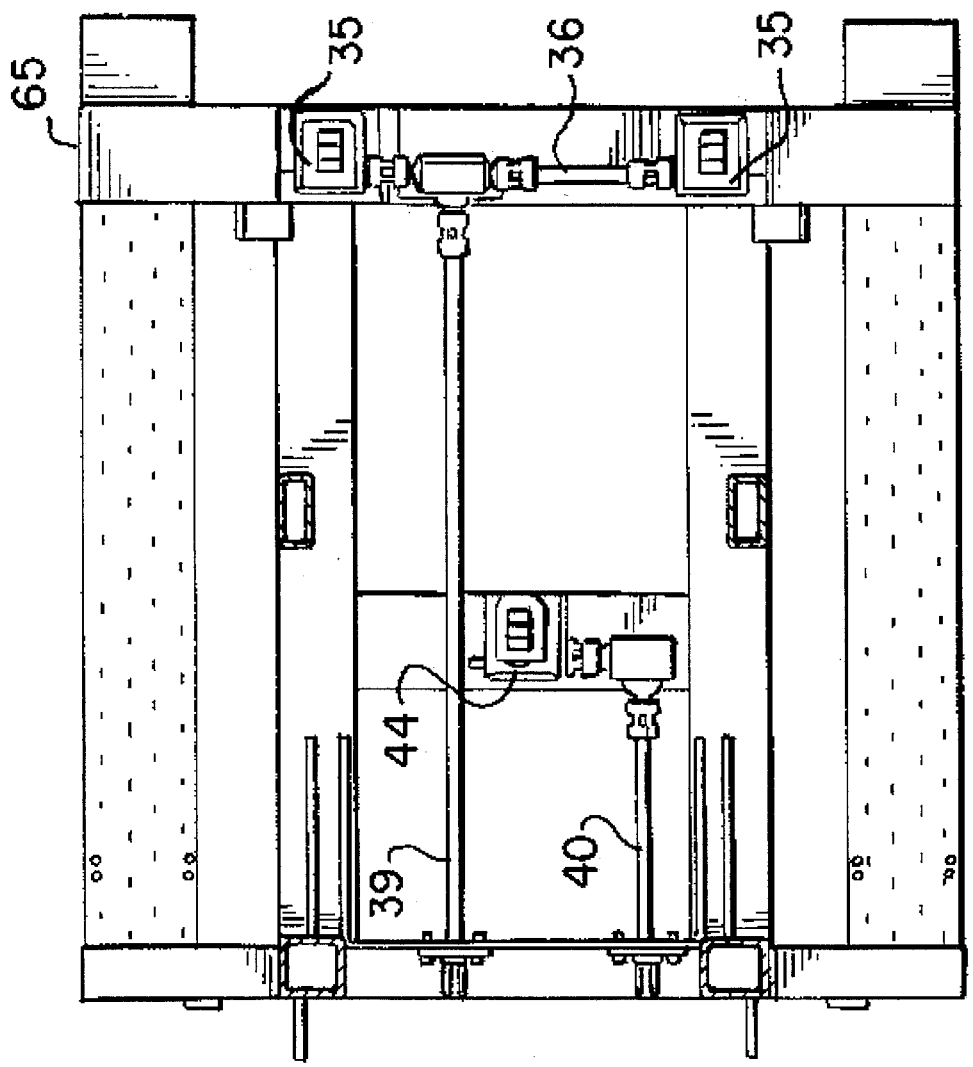
FIG. 4 is a sectional view of a modular solids charger in accordance with one embodiment of this invention taken along the line I—I shown in FIG. 1.

Elevation jack 35 and angle jack 44 may be any suitable mechanical, pneumatic or hydraulic mechanism known to the art for movement of charger plate support frame 23 with respect to chassis 65. In preferred embodiments, heavy duty screw jacks have been found suitable. In preferred embodiments, a plurality of elevation jacks 35 connected by cross-shaft 36 as shown, for example, in FIG. 4, may be used, dependent upon the size of the solids charger, most directly the width, and the nature and weight of solids upon removable charger plate assembly 20. FIG. 4 shows elevation jacks 35 located at opposite side regions of chassis 65. Elevation jacks 35 in the form of screw type jacks can be controlled by rotatable elevation jack extension shaft 39 which is force transmittingly connected to each of elevation jacks 35 in any manner known to the art for advancing and retracting the jack for controlling all of the individual elevation jacks 35 in unison. Rotatable elevation jack extension shaft 39 may extend to the exterior of one side of chassis 65 to enable easy rotation. It is readily apparent that the individual elevation jacks 35 may be controlled separately by separate similar rotatable elevation jack extension shafts to each jack when desired for additional control.

Angle jacking means may, likewise, comprise a plurality of individual angle jacks and be controlled in a manner as described above with respect to elevation jacks 35. Angle jacking means may also comprise a single angle jack, as best seen in FIG. 4, which may be controlled by rotatable angle jack extension shaft 40 which may extend to the exterior of one side of chassis 65 to enable easy rotation.

When two elevation jacks 35 and a single angle jack 44 are positioned as shown in FIG. 4, charger plate support frame 23 may be readily raised vertically to control the height of the drop of solid material into reactor 19, may have its angular relation to the horizontal changed in a front-to-rear manner to control the rate of feed of solid material to reactor 19, and may have its angular relation to the horizontal changed in a side-to-side manner to control the profile of feed of solid material to the reactor. Likewise, two angle jacks may be controlled in an individual separate manner to achieve all of the above movements, if desired.

Figure 9:
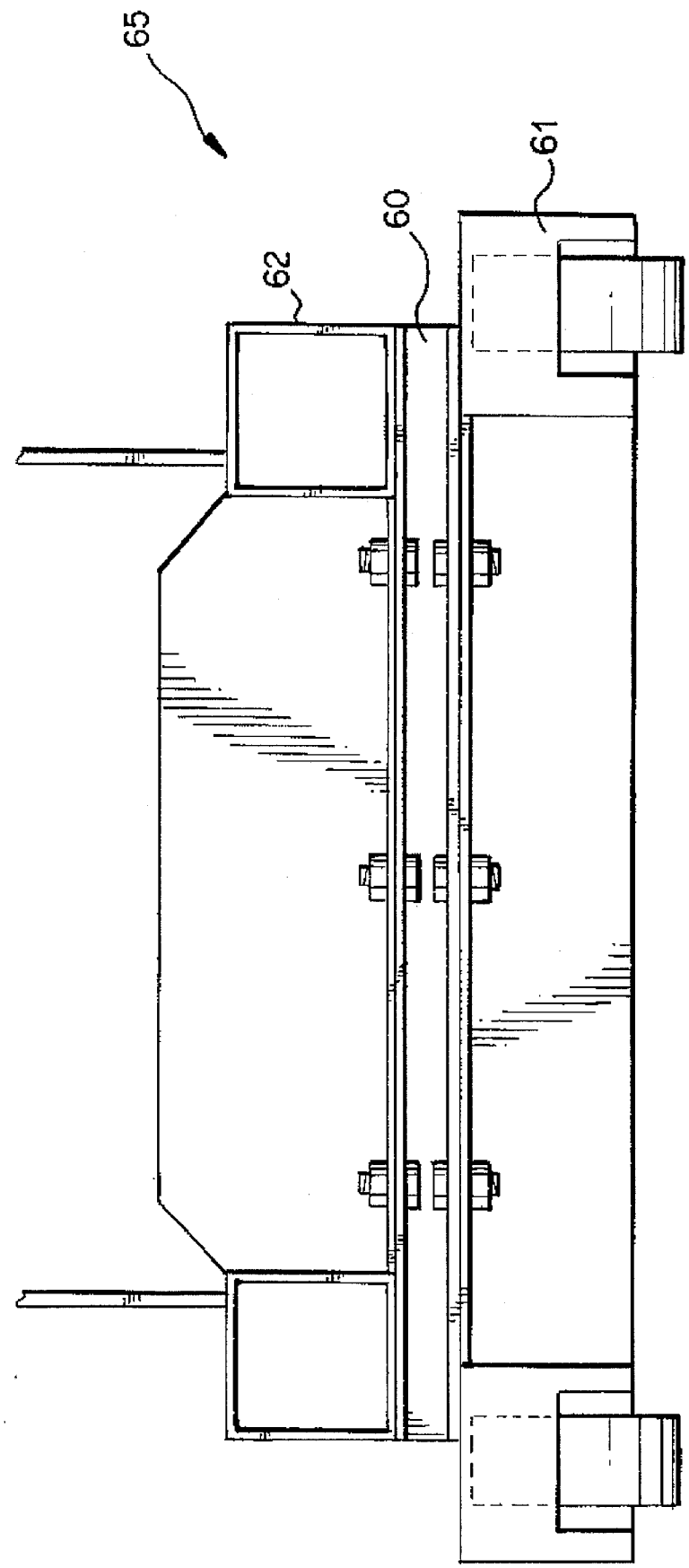
FIG. 9 is a partial rear view of the chassis of the modular solids charger showing a spacer for altering the elevation of the chassis to accommodate a range of elevations of reactor feed openings.

The primary benefit of the modular solids charger of this invention is its adaptability to a wide range of feeder openings within the walls of a reactor. Accordingly, in addition to changing the elevation of solids charger support frame 23 by adjustment of elevation jacks 35, more substantial changes in elevation are provided by the insertion of spacers 60 between a bottom portion 61 of chassis 65 and a top portion 62 of chassis 65 as shown in FIG. 9. In this manner, the height of charger plate support frame 23 may be adjusted as necessary to accommodate a broad range of elevations of reactor feeder openings.

Figure 5:
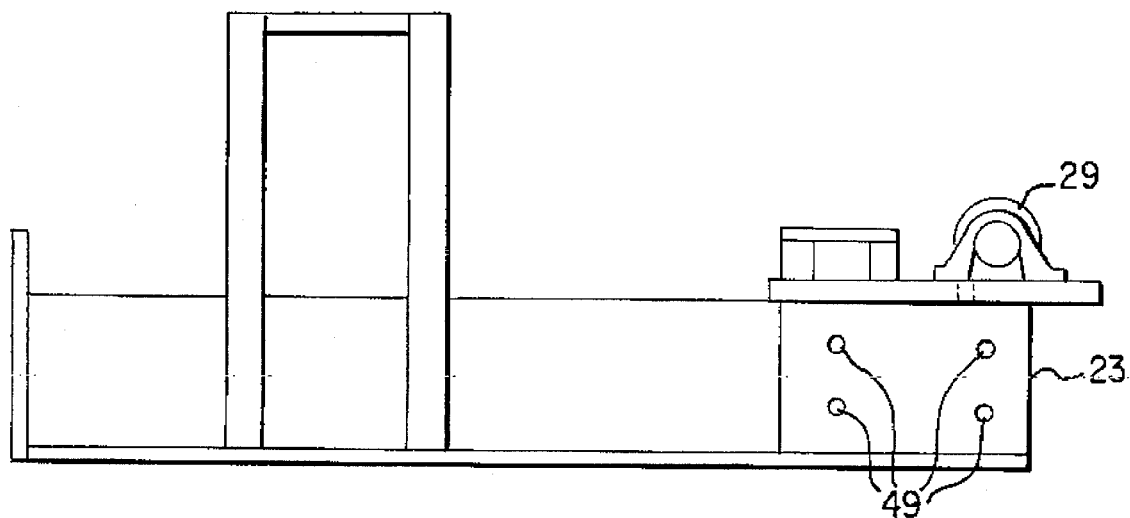
FIG. 5 is a side view of the charger plate support frame of the modular solids charger in accordance with one embodiment of this invention.
Figure 6:
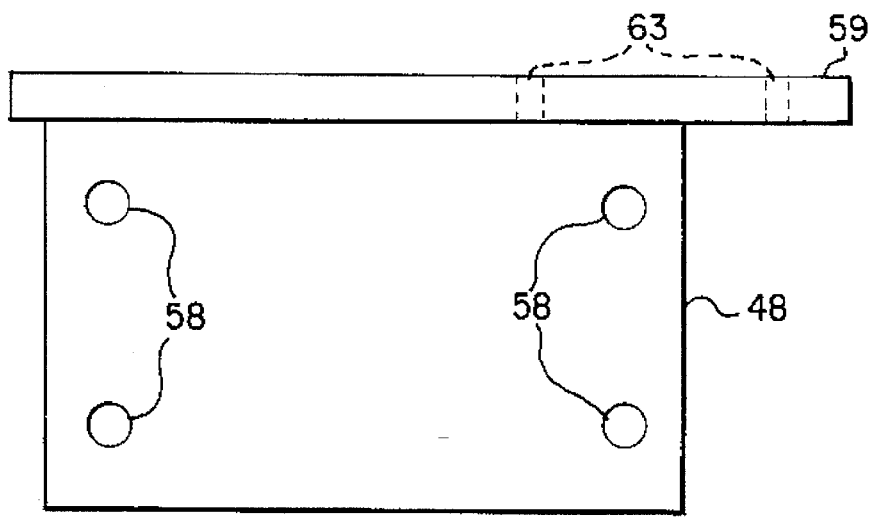
FIG. 6 is a side view of an extension section for the charger plate support frame of the modular solids charger of this invention.
Figure 8:
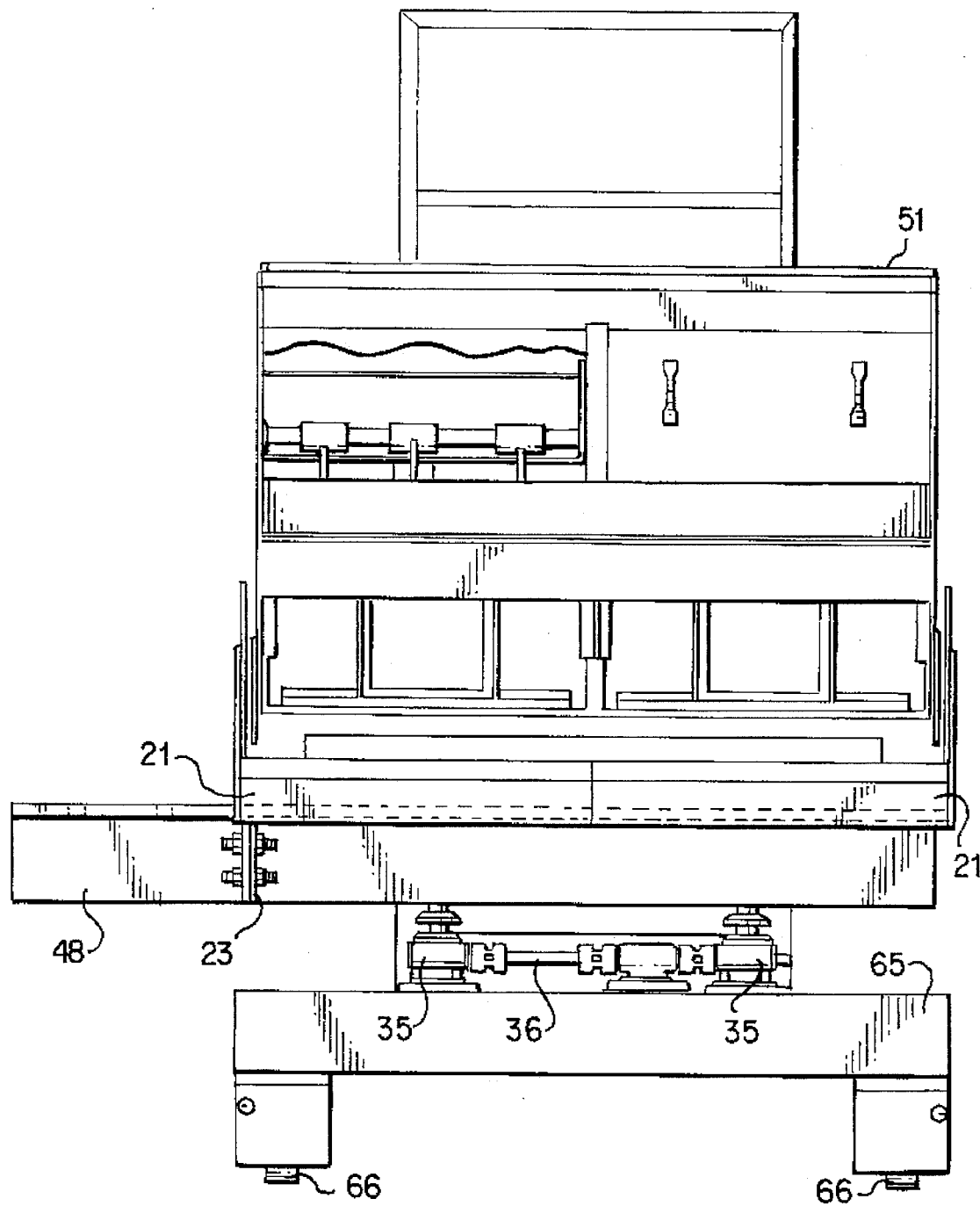
FIG. 8 is a front view of a modular solids charger with a charger plate support frame extension secured to the charger plate support frame.

To enable accommodation of reactor feeder openings of varying widths, the modular solids charger of this invention comprises means for adjusting the width of charger plate support frame 23 whereby charger plate support frame 23 is adaptable to accommodate a range of reciprocable charger plate widths. In accordance with one embodiment of this invention, said means comprises at least one bolt-on extension 48 as shown secured to charger plate support frame 23 in FIG. 8. FIG. 5 is a side view of charger plate support frame 23 in accordance with one embodiment of this invention having extension means 49 in the form, for example, of bolts extending from the side of charger plate support frame 23 for securing bolt-on extension 48 thereto. FIG. 6 shows a side view of a bolt-on extension to charger plate support frame 23 having extension means 58 which correspond to extension means 49 of charger plate support frame 23 and flat support structure extension 59 having bores 63 for securing additional front charger plate rollers 29.

Figure 7:
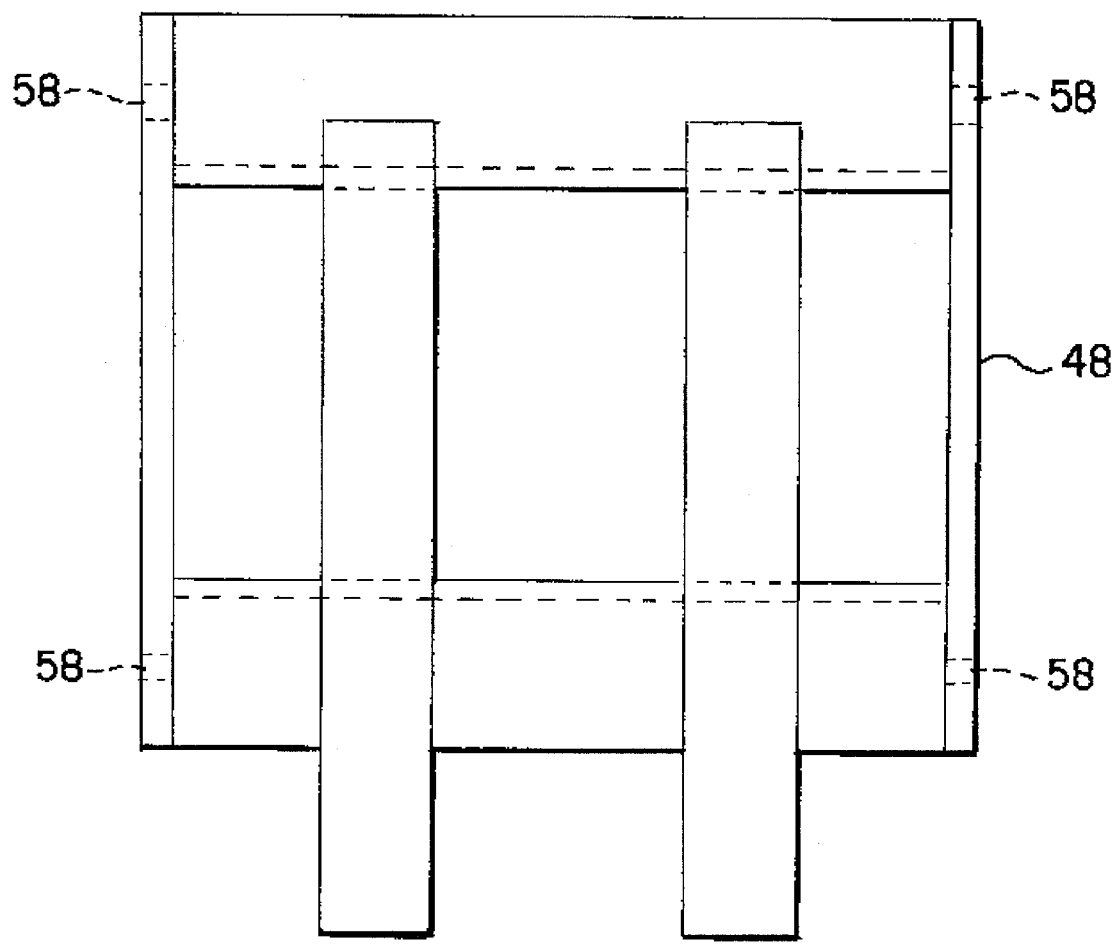
FIG. 7 is a top view of an extension section of a charger plate support frame for a modular solids charger in accordance with one embodiment of this invention.

FIG. 7 is a plan view of bolt-on extension 48 having extension means 58 on either side for connection to either side of charger plate support frame 23.

In accordance with one embodiment of the modular solids charger of this invention, charger plate support frame 23 is secured to chassis 65 by a floating link system comprising said elevation jacks 35 for adjusting the elevation of charger plate support frame 23, said elevation jacks 35 connecting chassis 65 to a front portion of charger plate support frame 23, said angle jacks 44 for adjusting the angle of charger plate support frame 23 with respect to the horizontal, said angle jacks 44 connecting chassis 65 to a rear portion of charger plate support frame 23, and a longitudinal charger plate frame support link 41 as shown in FIG. 1 pivotably connected at one end to a front portion of charger plate support frame 23 and at the opposite end to a rear portion of chassis 65.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A modular solids charger for feeding granular solid material to a reactor comprising:

a chassis;

a charger plate support frame vertically and angularly adjustable with respect to the horizontal secured to said chassis;

a removable reciprocable charger plate reciprocably secured to said charger plate support frame;

a removable solids supply chute disposed above said reciprocable charger plate for feeding solids to said reciprocable charger plate; and means for adjusting the width of said charger plate support frame whereby said charger plate support frame is adaptable to accommodate a range of reciprocable charger plate widths.

2. A modular solids charger in accordance with claim 1 further comprising means for adjusting the elevation of said chassis whereby said chassis is adaptable to accommodate a range of elevations of reactor feed openings.

3. A modular solids charger in accordance with claim 1, wherein said means for adjusting said width of said charger plate support frame comprises at least one bolt-on extension.

4. A modular solids charger in accordance with claim 1, wherein said charger plate support frame is secured to a front portion of said chassis by elevation jacking means for adjusting the elevation of said charger plate support frame and to a rear portion of said chassis by angle jacking means for adjusting the angle of said charger plate support frame with respect to the horizontal.

5. A modular solids charger in accordance with claim 1, wherein said charger plate support frame is secured to said chassis by a longitudinal charger plate frame support link, said longitudinal charger plate frame support link pivotably connected at one end to a front portion of said charger plate support frame and pivotably connected at an opposite end to a rear portion of said chassis.

6. A modular solids charger in accordance with claim 1 further comprising a floating link system attaching said charger plate support frame to said chassis, said floating link system comprising elevation jacking means for adjusting the elevation of said charger plate support frame connecting said chassis to a front portion of said charger plate support frame, angle jacking means for adjusting the angle of said charger plate support frame with respect to the horizontal connecting said chassis to a rear portion of said charger plate support frame, and a longitudinal charger plate frame support link pivotably connected at one end to a front portion of said charger plate support frame and pivotably connected at an opposite end to a rear portion of said chassis.

7. A modular solids charger in accordance with claim 4, wherein said elevation jacking means comprises two elevation jacks, each at opposite side regions of said front portion of said charger plate support frame, and said angle jacking means comprises a single angle jack in a central region of said rear portion of said charger plate support frame.

8. A modular solids charger in accordance with claim 7, wherein said elevation jacking means is controlled by a rotatable shaft force transmittingly connected to each elevation jack for controlling all of said elevation jacks in unison.

9. A modular solids charger in accordance with claim 7, wherein said angle jacking means is controlled by a rotatable shaft force transmittingly connected to said angle jack.

10. In a solids charger for feeding granular solid material to a reactor, said solids charger having a chassis, a charger plate support frame vertically and angularly adjustable with respect to the horizontal secured to said chassis, a reciprocable charger plate reciprocably secured to said charger plate support frame, and a solids supply chute disposed above said reciprocable charger plate for feeding solids to said reciprocable charger plate, the improvement comprising:

said solids charger being of a modular design whereby said reciprocable charger plate and said solids supply chute are removable, said chassis is adaptable to accommodate a range of elevations of reactor feed openings, and said charger plate support frame is adaptable to accommodate reciprocable charger plates having a range of widths; and a floating link system attaching said charger plate support frame to said chassis, said floating link system comprising elevation jacking means for adjusting the elevation of said charger plate support frame connecting said chassis to a front portion of said charger plate support frame, angle jacking means for adjusting the angle of said charger plate support frame with respect to the horizontal connecting said chassis to a rear portion of said charger plate support frame, and a longitudinal charger plate frame support link pivotably connected at one end to a front portion of said charger plate support frame and pivotably connected at an opposite end to a rear portion of said chassis.

11. A modular batch charger for feeding raw batch material to a glass melter comprising:

a chassis;

a charger plate support frame vertically and angularly adjustable with respect to the horizontal secured to said chassis;

a removable reciprocable charger plate reciprocably secured to said charger plate support frame;

a removable raw batch supply chute disposed above said reciprocable charger plate for feeding raw batch to said reciprocable charger plate; and means for adjusting at least one of the length and width of said charger plate support frame whereby said charger plate support frame is adaptable to accommodate a range of reciprocable charger plate widths.

12. A modular batch charger in accordance with claim 11 further comprising means for adjusting the elevation of said chassis whereby said chassis is adaptable to accommodate a range of elevations of doghouse openings.

13. A modular batch charger in accordance with claim 11, wherein said means for adjusting said width of said charger plate support frame comprises at least one bolt-on extension.

14. A modular batch charger in accordance with claim 11, wherein said charger plate support frame is secured to a front portion of said chassis by elevation jacking means for adjusting the elevation of said charger plate support frame and to a rear portion of said chassis by angle jacking means for adjusting the angle of said charger plate support frame with respect to the horizontal.

15. A modular batch charger in accordance with claim 11, wherein said charger plate support frame is secured to said chassis by a longitudinal charger plate frame support link, said longitudinal charger plate frame support link pivotably connected at one end to a front portion of said charger plate support frame and pivotably connected at an opposite end to a rear portion of said chassis.

16. A modular batch charger in accordance with claim 13, wherein said elevation jacking means comprises two elevation jacks, each at opposite side regions of said front portion of said charger plate support frame, and said angle jacking means comprises a single angle jack in a central region of said rear portion of said charger plate support frame.

* * * * *